United States Patent Office 3,706,748
Patented Dec. 19, 1972

3,706,748
SUBSTITUTED URACIL PHOSPHATES AS
PESTICIDES
Daniel D. Rosenfeld, 8 Thrush Drive, East Brunswick,
N.J. 08816, and Stanley Rosenhouse, 802 E. Front
St., Plainfield, N.J. 07062
No Drawing. Continuation-in-part of application Ser. No.
803, Jan. 5, 1970. This application Oct. 4, 1971, Ser.
No. 186,498
Int. Cl. C07d 51/30
U.S. Cl. 260—260
24 Claims

ABSTRACT OF THE DISCLOSURE

Uracil derivatives substituted on the imide nitrogen with a methylene thiophosphate grouping are biologically active compounds of exceptional pesticidal activity. These compounds can be characterized by the following structural formulas:

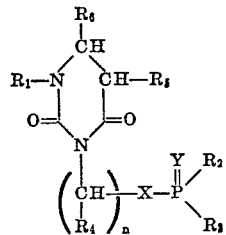

and

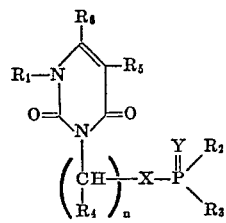

In this formula, $R_1$ is hydrogen or an organic radical; each of $R_2$ and $R_3$ is $C_1$–$C_6$ alkyl, $C_1$–$C_6$ alkoxy, $C_6$–$C_{10}$ aryloxy, $C_1$–$C_6$ haloalkyl, $C_6$–$C_{10}$ aryl, $C_6$–$C_{10}$ halo-substituted arylalkyl and $C_7$–$C_{11}$ halo-substituted arylalkyl; $R_4$ can be hydrogen, $C_1$–$C_4$ alkyl and halo-substituted derivatives thereof, $C_2$–$C_6$ alkenyl and alkynyl; each of $R_5$ and $R_6$ is hydrogen, $C_1$–$C_{16}$ alkyl, aryl, halo-substituted alkyl and aryl, alkoxy, $C_1$–$C_6$ alkenyl and alkynyl, alkyl sulfoxide, nitrile, alkyl amino, aryloxy, carboalkoxy, dialkylamino, nitro, alkoxyalkyl, alkylthioalkyl, halogen, alkylthio and sulfonyl; $n$ is an integer of from 1 to 2; and each of X and Y is oxygen or sulfur.

CROSS REFERENCE TO RELATED APPLICATION

This is a continuation-in-part of our application Ser. No. 803, filed Jan. 5, 1970, now abandoned.

This invention relates to novel substituted uracils. In one aspect, this invention relates to novel derivatives of 1-substituted uracils. In another aspect, this invention relates to the use of novel phosphoric and thiophosphoric acid ester derivatives of 1-substituted uracils as pesticides.

It is an object of the present invention to provide new thiophosphoric and phosphoric acid derivatives of substituted uracils which possess improved pesticidal activity;

It is another object of the subject invention to provide a novel pesticidal use for said compounds;

Other objects and many of the attended advantages of this invention will be readily appreciated as the same becomes better understood by reference to the following detailed description.

The compounds within the scope of this invention are characterized by the following structural formulas:

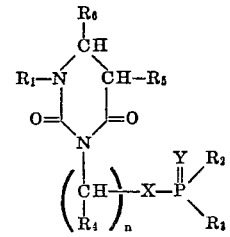

and

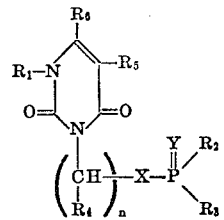

In this formula, $R_1$ is H or an organic radical; each of $R_2$ and $R_3$ is $C_1$–$C_6$ alkyl, $C_1$–$C_6$ alkoxy, $C_6$–$C_{10}$ aryloxy, $C_1$–$C_6$ thioalkyl, $C_1$–$C_6$ haloalkyl, $C_6$–$C_{10}$ aryl, $C_6$–$C_{10}$ halo-substituted aryl, $C_7$–$C_{11}$ arylalkyl and $C_7$–$C_{11}$ halo-substituted arylalkyl; $R_4$ can be hydrogen, $C_1$–$C_4$ alkyl, $C_2$–$C_6$ alkenyl and alkynyl and halo-substituted derivatives thereof; each of $R_5$ and $R_6$ is hydrogen, $C_1$–$C_{16}$ alkyl, aryl, halo-substituted alkyl and aryl, alkoxy, alkyl sulfoxide, nitrile, alkyl amino, aryloxy, carboalkoxy, dialkylamino, nitro, alkoxyalkyl, alkylthioalkyl, halogen, alkylthio and sulfonyl; $n$ is an integer of from 1 to 2; and each of X and Y is oxygen or sulfur.

In the above formula, the organic radical $R_1$ can be any suitable organic radical. The term organic radical includes dialkylamino, alkyl sulfonyl, alkoxy, arylamino, aliphatic, aryl, cycloaliphatic, aromatic, heterocyclic radicals and substituted derivatives. The organic radicals may be substituted with any substituent which does not interfere with pesticidal activity of the compound and can be, for example, halogen such as, for example, chloro, bromo, iodo, fluoro, and the like; nitro; alkoxy such as, for example, methoxy, ethoxy, propoxy, butoxy and the like; carboalkoxy, such as for example, carbomethoxy, carboethoxy, and the like; dialkyl amino, such as for example, dimethylamino, diethylamino, dipropylamino, methylethylamino, and the like; mercaptoalkyl; hydroxy and the like.

When aliphatic radicals are the organic radicals in the above formulae, they may be, for example, alkyl, alkenyl, alkynyl, aralkyl, and/or aralkenyl, cycloalkylalkyl.

Any suitable alkyl radical may be the organic radical such as, for example, lower alkyls, $C_1$–$C_6$ isomers thereof, such as for example, 2-methyl-butyl, 1,1-dimethylpropyl, 1-2-dimethylpropyl, 1,2-dimethylpropyl, 2,2-dimethylpropyl, 1-ethylpropyl and the like, and the corresponding straight chain and branch chain isomers of $C_6$ to $C_{12}$ alkyls, $C_3$–$C_7$ cycloalkyl substituted alkyl, such as, for example, cyclopropylmethyl, cyclopropyl ethyl, cyclopentylmethyl.

Any suitable alkenyl or alkenyl radical may be the organic radical such as, for example, ethenyl, 1-propenyl, 2- propenyl, isopropenyl, 1-butenyl, 2-butenyl, 3-butenyl and the corresponding branched chain isomers thereof such as, for example, 1-isobutenyl, 2-isobutenyl, 2-secondary-butenyl and 2-pentenyl, 3-pentenyl, ethenyl and propynyl.

Any suitable aralkyl radical may be the organic radical such as, for example, benzyl, phenyl-ethyl and phenyl propyl.

Any suitable aralkenyl radical may be the organic radical such as, for example, phenyl-ethenyl, phenyl-1-propenyl, β-phenyl-isopropenyl and phenyl derivatives of the isomers of butenyl, pentenyl and hexenyl.

Any suitable cycloalkyl radical may be the organic radical such as, for example, cyclopropyl, cyclobutyl, cycloamyl and cyclohexyl.

Any suitable cycloalkenyl radical may be the organic radical such as, for example, cyclopentenyl and cyclohexenyl.

Any suitable aryl radical may be the organic radical such as, for example, phenyl and substituted phenyl.

Any suitable alkaryl radical may be the organic radical such as, for example, isomeric tolyl and xylyl.

The specific examples of the novel compounds are as follows:

S-[(1-methyl-2,4-dioxo-5-cyano-6-allyl hexahydropyrimidinyl-3) methyl]-O,O-dimethyl phosphorodithioate
S-[(1-octyl-2,4-dioxo-5-amino hexahydropyrimidinyl-3)-ethyl] O,O-diethyl phosphorothioate
S-[(1-chloroethyl-2,4-dioxo-5-chloromethyl hexahydropyrimidinyl-3) methyl] O-ethyl-S-n-propyl phosphorothioate
S-[(1-phenylmethylamino-2,4-dioxo tetrahydropyrimidinyl-3)methyl] O,O-dipropyl phosphorodithioate
S-[(1-phenoxy-2,4-dioxo-5-carboethoxy hexahydropyrimidinyl-3) methyl] O-ethyl benzene phosphonothioate
S-[(1-propylsulfonyl-2,4-dioxo-5-nitro tetrahydropyrimidinyl-3) methyl] O-methyl-S-propyl phosphorodithioate
S-[(1-methyl-2,4-dioxo-5-dimethylamino hexahydropyrimidinyl-3) methyl] O,O-dimethyl phosphorothioate
S-[(1-butyl-2,4-dioxo tetrahydropyrimidinyl-3) 3-chloropropyl] O-ethyl-S-propyl phosphorodithioate
S-[(1-methyl-2,4-dioxo-5-dimethylamino hexahydropyrimidinyl-3) methyl] O-ethyl propane phosphonothioate
S-[(1-octyl-2,4-dioxo-5-amino hexahydropyrimidinyl-3) ethyl] O,O-dimethyl phosphorodithioate
S-[(1-phenoxyethyl-2,4-dioxo-5-nitro-6-propynyl hexahydropyrimidinyl-3) methyl] O,O-dibutyl phosphorothioate
S-[(1-ortho-chlorophenyl-2,4-dioxo-5,6-dibromo hexahydropyrimidinyl-3) methyl] O,O-ethyl phenyl phosphorodithioate
S-[(1-pyridyl-2,4-dioxo-5-bromo tetrahydropyrimidinyl-3) methyl] O,O-dimethyl phosphorothioate
S-[(1-vinyl-2,4-dioxo hexahydropyrimidinyl-3) methyl] O,O-dibutyl phosphorothioate
S-[(1-thiomethyl-2,4-dioxo tetrahydropyrimidinyl-3) methyl] O-methyl ethane phosphonothioate
S-[(1-methoxyethyl-2,4-dioxo-5-acetoxy methyl hexahydropyrimidinyl-3) methyl] O,O-diethyl phosphorodithioate
S-[(1-morpholino-2,4-dioxo tetrahydropyrimidinyl-3) methyl] O,O-dimethyl phosphorothioate
S-[(1-acetyl-2,4-dioxo-5-phenyl hexahydropyrimidinyl-3) butyl]O,O-dimethyl phosphorodithioate
S-[(1-phenylsulfonyl-2,4-dioxo-5-hydroxy hexahydropyrimidinyl-3) methyl] O,O-diethyl phosphorodithioate
S-[(1-p-chlorophenylamino-2,4-dioxo tetrahydropyrimidinyl-3) methyl] O,O-dimethyl phosphorothioate
S-[(1-methoxy-2,4-dioxo-5-chloro-6-methyl hexahydropyrimidinyl-3) ethyl] O,O-dimethyl phosphorothioate
S-[(1-methyl-2,4-dioxo-5-octyl hexahydropyrimidinyl-3) methyl] O,O-dimethyl phosphorodithioate
S-[(1-diethylamino-2,4-dioxo-5-acetoxy methyl hexahydropyrimidinyl-3) methyl] O,O-dipropyl phosphorothioate
S-[(1-propenyl-2,4-dioxo-5-methoxy hexahydropyrimidinyl-3) methyl] O-ethyl-S-propyl phosphorodithioate
S-[(1-propoxy-2,4-dioxo-5-butyl sulfonyl-hexahydropyrimidinyl-3) methyl] O,O-dimethyl phosphorothioate Essentially suitable as insecticides are those compounds having the formulas

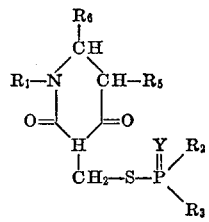

and

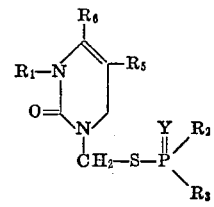

in which $R_1$ is hydrogen, alkyl, alkoxy, alkylthio, alkoxyalkyl, alkylsulfonyl, alkenyl or acetyl; each of $R_2$ and $R_3$ is alkoxy or alkylthio; each of $R_5$ and $R_6$ is hydrogen, alkyl or halogen; and Y is oxygen or sulfur. In these formulas, the alkyl moieties represented by or included in $R_1$, $R_2$, $R_3$, $R_5$ and $R_6$ are lower alkyl groups having from 1 to 4 carbon atoms. The alkenyl group represented by $R_1$ is a lower alkenyl having from 2 to 4 carbon atoms.

Particularly useful are those compounds in which $R_1$ is hydrogen or lower alkyl, especially methyl; $R_5$ is hydrogen or methyl; $R_6$ is hydrogen; and X is oxygen.

The compounds falling within the scope of this invention can be prepared by the following process. Schematically the process can be represented as follows:

(A)     (B)
$R-NH_2 + CH_2=CHCN \longrightarrow$ (C)          (D)
$R-NHCH_2CH_2CN + KNCO \xrightarrow{HCl}$

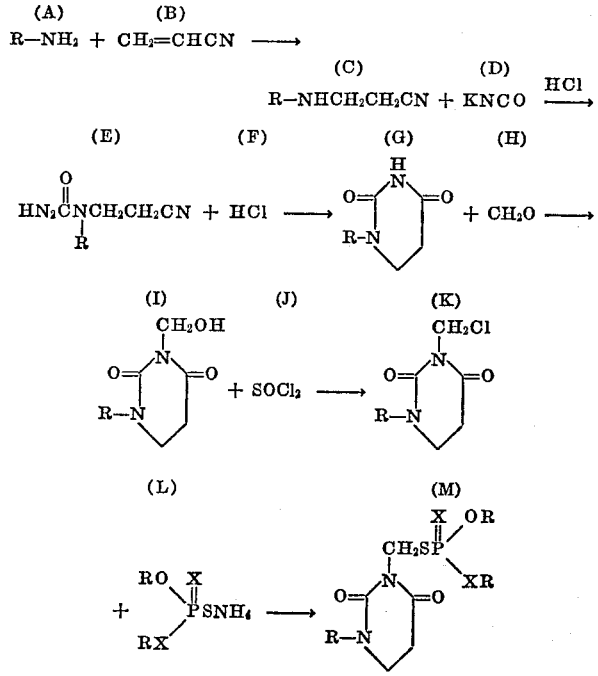

| Reactants | Temperature, °C. | Molar ratio | Pressure | Solvents |
|---|---|---|---|---|
| A+B | −20−+150 | 1:1−5:1 | Sub atm. to 10 atm. | Water, methanol, ethanol, isopropanol methyl cyanide, tetrahydrofuran. |
| Preferable | 0−25 | 1:1.2 | Atm | Water. |
| C+D | −30−+150 | 1:1−1:10 | Sub atm. to 10 atm. | Water, methanol, ethanol, tetrahydrofuran. |
| Preferable | 25−100 | 1:1.3 | Atm | Water. |
| E+F | −10−+150 | 1:1−1:10 | Sub atm. to 10 atm. | Water, methanol, ethanol, tetrahydrofuran. |
| Preferable | 25−100 | 1:1.5 | Atm | Water. |
| G+H | 0−250 | 1:1−1:20 | Sub atm. to 50 atm. | Water, methanol, ethanol, isopropanol, methyl cyanide, tetrahydrofuran, dimethylsulfoxide. |
| Preferable | 25−100 | 1:4 | Atm | Water. |
| I+J | −40−100 | 1:1−1:5 | Sub atm. to 10 atm. | Methylene chloride, chloroform. |
| Preferable | 25−70 | 1:2 | Atm | |

In place of J other halogenating agents such as phosphorus trichloride, phosphorus tribromide, phosphorus pentachloride, etc. can also be used.

| Reactants | Temperature, °C. | Molar ratio | Pressure | Solvents |
|---|---|---|---|---|
| K+L | 0−150 | 1:1−1:5 | Sub atm. to 10 atm. | Methyl cyanide, tetrahydrofuran, ethanol, methanol. |
| Preferable | 25−100 | 1:1.1 | Atm | Methyl cyanide. |

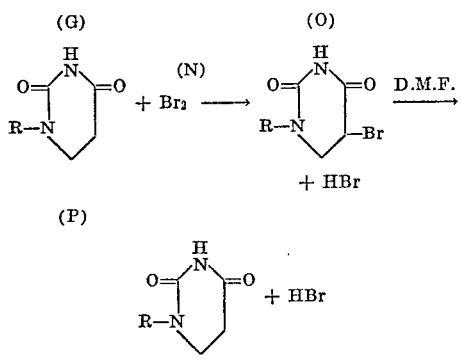

| Reactants | Temperature, °C. | Molar ratio | Pressure | Solvents |
|---|---|---|---|---|
| G+N | 0−250 | 1:1−1:10 | Sub atm. to atm. | Propionic acid, acetic acid. |
| Preferable | 25−110 | 1:1.2 | Atm | $CH_3COOH$. |
| | | Solvent to reactant ratio (wt.) | | |
| O | 25−350 | 1:1−100:1 | Sub atm. to 10 atm. | Dimethylformamide diglyme, nitrobenzene. |
| Preferable | 100−150 | 2:1−5:1 | Atm | Dimethylformamide. |

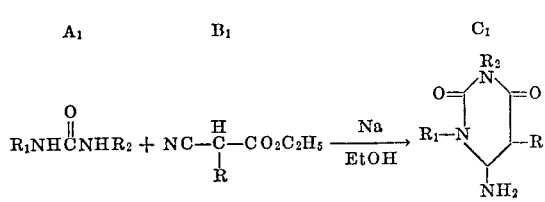

| Reactants | Temperature, °C. | Molar ratio | Pressure | Solvents |
|---|---|---|---|---|
| $A_1+B_1$ | 0−150 | 1:1−1:5 | Sub atm. to 10 atm. | Ethanol, methanol, tetrahydrofuran. |
| Preferable | 50−100 | 1:1 | Atm | Ethanol. |

The following examples are illustrative of this invention and demonstrate the utility of the new compounds prepared in accordance with this invention.

PREP of 1-METHYL 5,6 DIHYDROURACIL

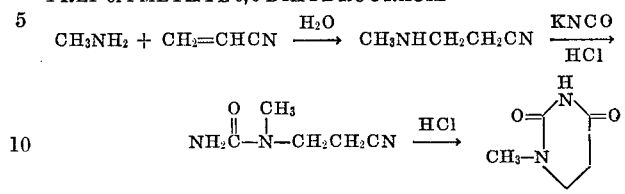

Procedure.—853 g. (11.0 moles) of a 40% solution of methylamine in water was charged into a 12 l.−4 neck flask equipped with; air stirrer, thermometer, condenser, and dropping funnel. To this solution was added dropwise, over a period of 2 hours, 530 grams (10.0 moles) of acrylonitrile. The temperature was maintained at 10−20° C. during the addition. After the addition was complete the reaction mixture was stirred at room temperature for 12 hours.

To this solution of the β-methylaminopropionitrile was then added 1000 ml. (12.0 moles) of concentrated HCl. This HCl salt of the β-methylaminopropionitrile was then added, over a period of 2 hours, to 1053 g. (13.0 moles) of potassium cyanate dissolved in 1.0 l. of water. A white precipitate formed and the reaction mixture was stirred at room temperature for 12 hours.

To this solution of the N-methyl-N- (B-cyanomethyl urea) was added 1660 ml. (20 moles) of concentrated hydrochloric acid. The reaction mixture was then heated to reflux for 2 hours.

The reaction mixture was then allowed to cool to room temperature and the product precipitated. Recrystallization from hot isopropyl alcohol yielded 520 g. (40%) of the 1-methyl 5,6 dihydrouracil which melted at 170−173° C. (M.P. in lit. 174−175° C.).

1 - isopropyl - 5,6 - dihydrouracil.—This compound was prepared by adding dropwise 10.0 moles of $CH_2=CHCN$ to 767 g. (13 moles) of isopropyl amine. After the addition was complete the reaction mixture was stirred at room temperature for 12 hours. The excess isopropylamine was then distilled off. The β-isopropylaminopropionitrile was then dissolved in 3 l. of water and reacted in the same manner as previously described for the preparation of 1-methyl-5,6-dihydrouracil. Recrystallization from hot benzene yielded 980 g. (63%) of the 1-isopropyl-5,6-dihydrouracil which melted at 140−143° C. (M.P. in lit. 143−144° C.).

Procedure.—To 128 g. (1.0 mole) of the 1-methyl-5,6-dihydrouracil in 300 ml. of refluxing acetic acid, was added slowly dropwise, over a period of 1 hour, 176 g. (1.1 moles) of bromine dissolved in 200 ml. acetic acid. After the addition was complete the reaction was heated to reflux for 1 hour.

The solvent was evaporated on a roto vacuum evaporator. A yellow oil remained. The residue was diluted with 200 ml. water. A solid precipitated. Then a 10% NaOH solution was added until the solution was neutral. The product was collected by filtration and recrystallized from 600 ml. of ethyl alcohol which yielded 98 g. (45%) M.P. 153−155° C. (M.P. in lit. 140−144° C.). Structure confirmed by N.M.R. and I.R.

PREPARATION OF 1-METHYL URACIL

Procedure.—369 g. (1.77 moles) of the 5-bromo-5,6-dihydro-1-methyluracil was added in small portions to 500 ml. of refluxing dimethylformamide; and the resulting solution was refluxed for one hour. The reaction mixture was allowed to cool to room temperature. The product precipitated and was collected by filtration. It was then washed with 500 ml. of ethyl alcohol. Yield 166 g. (74%) M.P. 225–231° C. (M.P. in lit. 232–233° C.).

PREPARATION OF 3(HYDROXY METHYL) DIHYDROURACILS

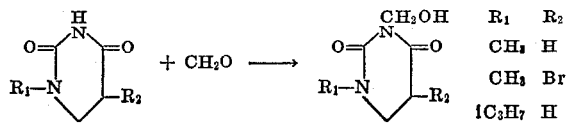

Procedure.—A mixture of the corresponding dihydrouracil in three times its weight of water, and four molecular equivalents of a 37% solution of formaldehyde were heated to reflux for four hours. The water solution was then concentrated on a roto vacuum evaporator. The resulting residue was placed under vacuum (0.10 mm.) at 75° C. for one hour. The remaining viscous oil was redissolved in chloroform, dried over anhydrous magnesium sulfate, and filtered. The chloroform solution was then concentrated on the roto vacuum evaporator and the residue placed under vacuum (0.10 mm.) at 75° C. for one hour. Any further purification proved to be extremely difficult due to the various formaldehyde polymers combined with the product.

| $R_1$ | $R_2$ | Percent yield crude | Physical properties | Analytical data |
|---|---|---|---|---|
| $CH_3$ | H | 95+ | Viscous oil | N.M.R. and I.R. |
| $CH_3$ | Br | 95+ | do | Do. |
| $iC_3H_7$ | H | 95+ | do | Do. |

The 3(hydroxy methyl)-1-methyluracil was also prepared by the above procedure which gave a yield of 95%+ of a viscous oil. N.M.R. and I.R. confirmed structure.

Preparation of 3(Chloromethyl) Dihydrouracils

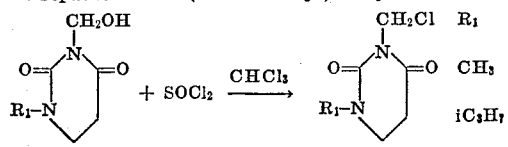

Procedure.—To 1.0 mole of the corresponding 3(hydroxymethyl)dihydrouracil in 700 ml. of chloroform was added dropwise, over a period of ½ hour, 258 g. (2.0 moles) of thionyl chloride. The reaction was slightly exothermic with the evolution of a gas noted. After the addition was complete the reaction mixture was heated to reflux for three hours. The solvent was then evaporated on the roto vacuum evaporator and the residue was placed under vacuum (0.10 mm.) at 70° C. for ½ hour. The remaining yellow oil was redissolved in 500 ml. benzene and washed with 100 ml. ice water. The benzene solution was then dried over anhydrous magnesium sulfate, filtered, and concentrated on the roto vacuum evaporator. The residue was then placed under vacuum at 70° C. for one hour.

| $R_1$ | Percent yield | Physical properties | Analytical data |
|---|---|---|---|
| $CH_3$ | 61 | Viscous oil | N.M.R. and I.R. |
| $iC_3H_7$ | 43 | do | Do. |

The 3(bromomethyl)-1-methyl dihydrouracil and the 3(bromomethyl)-5-bromo-1-methyldihydrouracil were also prepared by reacting 1.0 mole of the corresponding 3(hydroxymethyl) dihydrouracil with 1.0 mole of phosphorous tribromide according to the procedure described for the preparation of the 3(chloromethyl) dihydrouracils.

The following procedure also applies to the preparation of uracil phosphates.

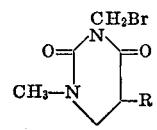

| R | Percent yield | Physical properties | Analytical data |
|---|---|---|---|
| H | 21 | Viscous oil | N.M.R. and I.R. |
| Br | 33 | Solid M.P. 112–125° C | Do. |

Preparation of S-[(1-alkyl-2,4-dioxohexahydropyrimidinyl-3)methyl] O,O-dialkylphosphoro(di)thioate Procedure.—0.10 mole of the corresponding 3(chloromethyl)dihydrouracil or the 3(bromomethyl)dihydrouracil, 300 ml. of acetonitrile, and 0.11 mole of the ammonium salt of either the monothio or dithio phosphate acid, were heated to reflux for 4 hours. The solvent was then evaporated on the roto vacuum evaporator. The remaining residue was redissolved in 200 ml. benzene, filtered, and washed with 50 ml. of ice water. The benzene solution was dried over anhydrous magnesium sulfate, filtered and the filtrate concentrated on the roto vacuum evaporator. The remaining residue was placed under vacuum (0.10 mm.) at 75° C. for 1 hour.

The corresponding uracil phosphates were prepared by the above procedure.

| | Percent yield | Analytical data | | | | | | | |
|---|---|---|---|---|---|---|---|---|---|
| | | Calculated | | | | Found | | | |
| | | C | H | N | P | C | H | N | P |
| 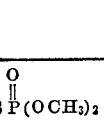 | 40 | 34.0 | 5.35 | 9.93 | 10.56 | 33.59 | 5.24 | 9.65 | 10.39 |
|  | 68 | 38.8 | 6.17 | 9.03 | 9.9 | 38.01 | 6.31 | 8.18 | 9.03 N.M.R. and I.R. |

|  | Percent yield | Analytical data | | | | | | | | |
|---|---|---|---|---|---|---|---|---|---|---|
|  |  | Calculated | | | | Found | | | | |
|  |  | C | H | N | P | C | H | N | P |  |
| CH₃-N, N-CH₂SP(OCH₃)₂ (S), dioxo ring | 56 | 32.2 | 4.43 | 9.42 | 10.38 | 31.07 | 5.00 | 8.15 | 10.65 | Do. |
| CH₃-N, N-CH₂SP(OC₂H₅)₂ (S), dioxo ring | 62 | 36.9 | 5.83 | 8.58 | 9.47 | 36.79 | 5.75 | 8.14 | 9.51 | Do. |
| CH₃-N, N-CH₂SP(O)(OC₂H₅)(SC₃H₇), dioxo ring | 63 | 39.1 | 6.3 | 8.24 | 9.1 | 38.58 | 6.00 | 8.08 | 8.71 | Do. |

|  | Percent yield | Analytical data | | | | | | | | |
|---|---|---|---|---|---|---|---|---|---|---|
|  |  | Calculated | | | | Found | | | | |
|  |  | C | H | N | Br | C | H | N | Br |  |
| CH₃-N, N-CH₂SP(OCH₃)₂ (O), Br, dioxo ring | 50 | 26.6 | 3.91 | 7.76 | 22.2 | 28.45 | 4.20 | 7.88 | 23.25 | N.M.R. and I.R. |
| CH₃-N, N-CH₂SP(OC₂H₅)₂ (O), Br, dioxo ring | 65 | -- | -- | -- | -- | -- | -- | -- | -- | Do. |
| iC₃H₇-N, N-CH₂SP(OC₂H₅)₂ (O), dioxo ring | 61 | -- | -- | -- | -- | -- | -- | -- | -- | Do. |
| iC₃H₇-N, N-CH₂SP(OC₂H₅)₂ (S), dioxo ring | 94 | -- | -- | -- | -- | -- | -- | -- | -- | Do. |
|  |  |  |  |  | P |  |  |  | P |  |
| CH₃-N, N-CH₂SP(OCH₃)₂ (O), dioxo ring | 36 | 34.2 | 4.67 | 10.0 | 10.65 | 34.66 | 4.98 | 8.64 | 8.64 | Do. |
| CH₃-N, N-CH₂SP(OC₂H₅)₂ (O), dioxo ring | 59 | -- | -- | -- | -- | -- | -- | -- | -- | Do. |

As previously noted, the uracil thiophosphate esters of this invention are useful as pesticides, particularly as insecticides. When used as an insecticide, the biologically active uracil and dihydrouracil thiophosphate esters are preferably formulated with a suitable carrier or diluent or combinations thereof.

The term "carrier" or "diluent" as used herein means a material, which can be inorganic or organic and synthetic or of natural origin, with which the active dihydrouracil thiophosphate esters are mixed or formulated to facilitate its storage, transport, and handling and application to hte insects to be treated. The carrier is preferably biologically and chemically inert and, as used, can be a solid or fluid. When solid carriers are used, they are preferably particulate, granular, or pelleted; however, other shapes and sizes of solid carrier can be employed as well. Such preferable solid carriers can be natural occurring minerals—although subsequently subjected to grinding, sieving, purification, and/or other treatments—including for example, gypsum, tripolite; diatomaceous earth; mineral silicates such as mica, vermiculite, talc, and pyrophyllite; clays of the montmorillonite, kaolinite, or attapulgite groups; calcium or magnesium limes; or calcite and dolomite; etc. Carriers produced synthetically, as for example, synthetic hydrated silica oxides and synthetic calcium silicates can also be used. The carrier can also be an elemental substance such as sulfur or carbon, preferably an activated carbon. If the carrier possesses intrinsic catalytic activity such that it would decompose the active ingredient, it is advantageous to incorporate a stabilizing agent, as for example, polyglycols such as diethylene glycol to neutralize this activity and thereby prevent possible decomposition of the dihydrouracil thiophosphate esters.

For some purposes, a resinous or waxy carrier can be used, preferably one which is solvent soluble or thermoplastic, including fusible. Examples of such carriers are natural or synthetic resins such as a coumarone resin, rosin, copal, shellac, dammar, polyvinyl chloride, styrene polymers and copolymers, a solid grade of polychlorophenol such as is available under the registered trademark "Aroclor," a bitumen, an asphaltite, a wax, for example, beeswax or a mineral wax such as paraffin wax or montan wax, or a chlorinated mineral wax, or a microcrystalline wax such as those available under the registered trademark "Mikrovan wax." Compositions comprising such resinous or waxy carriers are preferably in granular or pelleted form.

Fluid carriers can be liquids, as for example, water, or an organic fluid, including a liquefied normally vaporous or gaseous material, or a vaporous or gaseous material, and can be horticultural petroleum spray oils boiling in the range of from about 275° to about 575° F., orf boiling in the range of about 575° to about 1000° F. and having an unsulfonatable residue of at least about 75% and preferably of at least about 90%, or mixtures of these two types of oil, are particularly suitable liquid carriers.

The carrier can be mixed or formulated with the active material during its manufacture or at any stage subsequently. The carrier can be mixed or formulated with the active material in any proportion depending on the nature of the carrier. One or more carriers, moreover, can be used in combination.

The compositions of this invention can be concentrates, suitable for storage or transport and containing, for example, from about 5 to about 90% by weight of the active dihydrouracil thiophosphate esters ingredient, preferably from about 20 to about 80 wt. percent. These concentrates can be diluted with the same or different carrier to a concentration suitable for application. The compositions of this invention may also be dilute compositions suitable for application. In general, concentrations of about 0.1 to about 10% by weight, of active material based on the total weight of the composition are satisfactory, although lower and higher concentrations can be applied if necessary.

The compositions of this invention can also be formulated as dusts. These comprise an intimate admixture of the active dihydrouracil thiophosphate esters ingredient and a finely powdered solid carrier such as aforedescribed. The powdered carriers can be oil-treated to improve adhesion to the surface to which they are applied. These dusts can be concentrates, in which case a highly sorptive carrier is preferably used. These require dilution with the same or a different finely powdered carrier, which can be of lower sorptive capacity, to a concentration suitable for application.

The compositions of the invention can be formulated as wettable powders comprising a major proportion of the dihydrouracil thiophosphate esters mixed with a dispersing, i.e., deflocculating or suspending, agent, and if desired, a finely divided solid carrier and/or a wetting agent. The dihydrouracil thiophosphate esters can be in particulate form or adsorbed on the carrier and preferably constitutes at least about 10%, more preferably at least about 25%, by weight of the composition. The concentration of the dispersing agent should in general be between about 0.5 and about 5% by weight of the total composition, although larger or smaller amounts can be used, if desired.

The dispersing agent used in the composition of this invention can be any substance having definite dispersing, i.e., deflocculating or suspending, properties as distinct from wetting properties, although these substances can also possess wetting properties as well.

The dispersant or dispersing agent used can be protective colloids such as gelatin, glue, casein, gums, or a synthetic polymeric material such as polyvinyl alcohol and methyl cellulose. Preferably, however, the dispersants or dispersing agents used are sodium or calcium salts of high molecular weight sulfonic acids, as for example, the sodium or calcium salts of lignin sulfonic acids derived from sulfite cellulose waste liquors. The calcium or sodium salts of condensed aryl sulfonic acid, for example, the products known as "Tamol 731," are also suitable.

The wetting agents used can be non-ionic type surfactants, as for example, the condensation products of fatty acids containing at least 12, preferably 16 to 20, carbon atoms in the molecule, or abietic acid or naphthenic acid obtained in the refining of petroleum lubricating oil fractions with alkylene oxides such as ethylene oxide or propylene oxide, or with both ethylene oxide and propylene oxide, as for example, the condensation product of oleic acid and ethylene oxide containing about 6 to 15 ethylene oxide units in the molecule. Other non-ionic wetting agents like polyalkylene oxide polymers, commercially known as "Pluronics" can be used. Partial esters of the above acids with polyhydric alcohols such as glycerol, polyglycerol, sorbitol, or mannitol can also be used.

Suitable anionic wetting agents include the alkali metal salts, preferably sodium salts, of sulfuric acid esters or sulfonic acids containing at least 10 carbon atoms in a molecule, for example, the sodium secondary alkyl sulfates, dialkyl sodium sulfosuccinate available under the registered trademark "Teepol," sodium salts of sulfonated castor oil, sodium dodecyl benzene sulfonate.

Granulated or pelleted compositions comprising a suitable carrier having the active uracil thiophosphate esters ingredient incorporated therein are also included in this invention. These can be prepared by impregnating a granular carrier with a solution of the uracil thiophosphate esters or by granulating a mixture of a finely divided solid carrier and the active uracil thiophosphate esters. The carrier used can consist of or contain a fertilizer or fertilizer mixture, as for example, a superphosphate.

The compositions of this invention can also be formulated as solutions of the active uracil thiophosphate esters ingredient in an organic solvent or mixture of solvents, such as for example alcohols; ketones, especially acetone; ethers; hydrocarbons; etc.

Where the toxicant itself is a liquid these materials can be sprayed on crops or insects without further dilution.

Petroleum hydrocarbon fractions used as solvents should preferably have a flash point above 73° F., an example of this being a refined aromatic extract of kerosene. Auxiliary solvents such as alcohols, ketones, and polyalkylene glycol ethers and esters can be used in conjunction with these petroleum solvents.

Compositions of the present invention can also be formulated as emulsifiable concentrates which are concentrated solutions or dispersions of the active uracil thiophosphate esters in an organic liquid, preferably a water-insoluble organic liquid, containing an added emulsifying agent. These concentrates can also contain a proportion of water, for example, up to about 50% by volume, based on the total composition, to facilitate subsequent dilution with water. Suitable organic liquids include, e.g., the above petroleum hydrocarbon fractions previously described.

The emulsifying agent can be of the type producing water-in-oil type emulsions which are suitable for application by low volume spraying, or an emulsifier of the type producting oil-in-water emulsions can be used, producing concentrates which can be diluted with relatively large volumes of water for application by high volume spraying or relatively small volumes of water for low volume spraying. In such emulsions, the active uracil thiophosphate esters are preferably in a nonaqueous phase.

General experimental procedures for biological testing

In the examples which follow, the new dihydrouracil thiophosphate esters were treated in the greenhouse and in the laboratory to determine their biological activity.

The experimental compounds were tested as aqueous emulsions. These emulsions were prepared by dissolving the compound in acetone and dispersing it in distilled water with Triton X-100, an alkylaryl polyether alcohol derived by the reaction of i-octyl phenol with ethylene oxide, to give spray emulsions containing the desired concentration of the compound. These emulsions were then used in standard laboratory tests described below.

Mexican bean beetle.—Bean leaves were dipped in the emulsion of the test chemical and allowed to dry. The individual treated leaves were placed in Petri dishes and five Mexican bean beetle larvae introduced into each of the two replicate dishes.

Mites, contact.—Potted bean plants infested with the two-spotted spider mites were placed on a turntable and sprayed with a formulation of the test chemical. The plants were held for seven days and the degree of mite control was rated after this period.

Mites, systemic.—Bean plants were treated by applying 20 ml. of the formulated test chemical to the soil. The mites were transferred to the plants after 24 hours. The plants were held for seven more days and the degree of mite control rated.

Aphid, contact.—Potted nasturtium plants infested with the bean aphids were placed on a turntable and sprayed with a formulation of the test chemical. The plants were held for two days and the degree of aphid control was rated.

Aphid, systemic.—Nasturtium plants were treated by applying 20 ml. of the formulated test chemical to the soil. The mites were transferred to the plants after 24 hours. The plants were held for 48 additional hours and the degree of the aphid control rated.

Boll weevil.—Five mixed sex adult Boll weevils placed in a wire screen cage were sprayed with the proper concentration of formulated test chemical. The boll weevils were provided with sucrose solution on a filter paper. The cages were held at about 70° F. for 24 hours and the percent mortality read after 24 hours.

Some of the selected compounds of this class were also tested against Southern Army worm, other insects of aphids and Coleoptera famly, and against resistant mites and were found to be active.

TABLE I

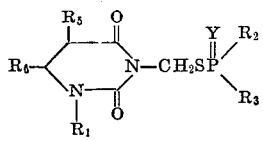

| Compound | | | | | | | | Percent control | | | | | |
|---|---|---|---|---|---|---|---|---|---|---|---|---|---|
| | | | | | | | | | Mite-C | | Mite-S | | |
| $R_1$ | $R_2$ | $R_3$ | $R_5$ | $R_6$ | Y | Conc., p.p.m. | MBB | Adult | Nymph | Adult | Nymph | Aphid-C | Aphid-S |
| $CH_3$ | $OCH_3$ | $OCH_3$ | H | H | O | 250 | 100 | 100 | 100 | 100 | 100 | 100 | 100 |
| $CH_3$ | $OCH_3$ | $OCH_3$ | H | H | S | 250 | 100 | 100 | 100 | 100 | 100 | 100 | 100 |
| $CH_3$ | $OC_2H_5$ | $OC_2H_5$ | H | H | O | 250 | 100 | 100 | 100 | 100 | 100 | 100 | 100 |
| $CH_3$ | $OC_2H_5$ | $OC_2H_5$ | H | H | S | 250 | 100 | 100 | 100 | 100 | 100 | 100 | 100 |
| $CH_3$ | $OC_2H_5$ | $SC_3H_7$ | H | H | O | 250 | 100 | 100 | 100 | 100 | 100 | 0 | 40 |
| $CH_3$ | $OCH_3$ | $OCH_3$ | Br | H | O | 250 | 100 | 100 | 100 | 100 | 100 | 100 | 100 |
| $CH_3$ | $OC_2H_5$ | $OC_2H_5$ | Unsat. | | O | 250 | 100 | 100 | 100 | 100 | 100 | 100 | 100 |
| $CH_3$ | $OC_2H_5$ | $OC_2H_5$ | Br | H | O | 250 | 100 | 100 | 80 | 100 | 80 | 50 | 80 |
| $CH_3$ | $OCH_2$ | $OCH_3$ | Unsat. | | O | 250 | 100 | 100 | 100 | 100 | 100 | 100 | 100 |
| $iC_3H_7$ | $OC_2H_5$ | $OC_2H_5$ | H | H | O | 250 | 100 | 100 | 100 | 100 | | 90 | |
| $iC_3H_7$ | $OC_2H_5$ | $OC_2H_5$ | H | H | S | 250 | 100 | 100 | 100 | 100 | 0 | 50 | |

TABLE II

Herbicidal activity of—
S-[(1 - methyl - 2,4 - dioxohexahydropyrimidinyl-3) methyl]O,O-dimethyl phosphorodithioate Conc., 10 lbs./a.:  Phytotoxicity rating
- Barnyard grass _____ 10
- Crabgrass _____ 10
- Foxtail _____ 10
- Zinnia _____ 10
- Mustard _____ 10
- Morning glory _____ 7

S-[(1 - methyl - 2,4 - dioxo hexahydropyrimidinyl-3) methyl]O,O-diethyl phosphorothioate Conc., 10 lbs./a.:  Phytotoxicity rating
- Barnyard grass _____ 6
- Crabgrass _____ 9
- Foxtail _____ 9
- Zinnia _____ 10
- Mustard _____ 8
- Morning glory _____ 6

Rating:
0=0% kill
10=100% kill

We claim:
1. A compound of the formula

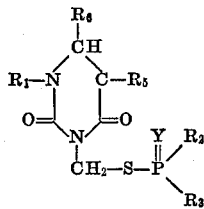

or

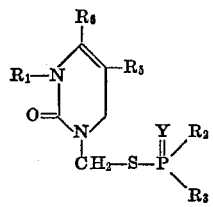

wherein $R_1$ is hydrogen, lower alkyl, lower alkoxy, lower alkylthio, lower alkoxy, lower alkyl, lower alkylsulfonyl, lower alkenyl or acetyl; each of $R_2$ and $R_3$ is lower alkoxy or lower alkylthio; each of $R_5$ and $R_6$ is hydrogen, lower alkyl or halogen; and Y is oxygen or sulfur.

2. A compound according to claim 1 in which $R_1$ is hydrogen or lower alkyl, $R_5$ is hydrogen or methyl, $R_6$ is hydrogen, and X is oxygen.

3. A compound according to claim 1 which is S-[(1-iso-propyl-2,4-dioxo hexahydropyrimidinyl-3) methyl] O,O-diethyl phosphorothioate.

4. A compound according to claim 2 which is S-[(1-isopropyl-2,4-dioxo hexahydropyrimidinyl-3) methyl] O,O-diethyl phosphorothioate.

5. A compound according to claim 2 which is S-[(1-methyl-2,4-dioxo hexahydropyrimidinyl-3) methyl] O,O-diethyl phosphorothioate.

6. A compound according to claim 2 which is S-[(1-methyl-2,4-dioxo hexahydropyrimidinyl-3) methyl] O,O-dimethyl phosphorothioate.

7. A compound according to claim 2 which is S-[(1-methyl-2,4-dioxo tetrahydropyrimidinyl-3) methyl] O,O-dimethyl phosphorothioate.

8. A compound according to claim 1 which is S-[(1-methyl-2,4-dioxo-5-bromo-hexahydropyrimidinyl-3) methyl] O,O-dimethyl phosphorothioate.

9. A compound according to claim 1 which is S-[(1-methyl-2,4-dioxo-5-bromo hexahydropyrimidinyl-3) methyl] O,O-diethyl phosphorothioate.

10. A compound according to claim 2 which is S-[(1-methyl-2,4-dioxo hexahydropyrimidinyl-3) methyl] O-ethyl-S-n-propyl phosphorodithioate.

11. A compound according to claim 1 which is S-[(1-methyl-2,4-dioxo tetrahydropyrimidinyl-3) methyl] O-ethyl-O-n-propyl phosphorodithioate.

12. A compound according to claim 2 which is S-[(1-methyl-2,4-dioxo-5-methyl hexahydropyrimidinyl-3) methyl] O,O-dimethyl phosphorothioate.

13. A compound according to claim 2 which is S-[(2,4-dioxo hexahydropyrimidinyl-3) methyl] O,O-dimethyl phosphorothioate.

14. A compound according to claim 2 which is S-[(2,4-dioxo hexahydropyramidinyl-3) methyl] O-ethyl-S-propyl phosphorodithioate.

15. A compound according to claim 1 which is S-[(1-methyl sulfonyl-2,4-dioxo hexahydropyrimidinyl-3) methyl] O,O-dimethyl phosphorothioate.

16. A compound according to claim 1 which is S-[(1-acetyl-2,4-dioxo hexahydropyrimidinyl-3) methyl] O,O-dimethyl phosphorothioate.

17. A compound according to claim 1 which is S-[(1-acetyl - 2,4 - dioxo hexahydropyrimidinyl - 3) methyl] O-methyl-S-n-propyl phosphorodithioate.

18. A compound according to claim 1 which is S-[(1-methoxyethyl-2,4-dioxo hexahydropyrimidinyl-3) methyl] O,O-dimethyl phosphorothioate.

19. A compound according to claim 1 which is S-[(1-methyl sulfonyl-2,4-dioxo tetrahydropyrimidinyl-3) methyl] O,O-dimethyl phosphorothioate.

20. A compound according to claim 1 which is S-[(1-allyl-2,4-dioxo hexahydropyrimidinyl-3) methyl] O,O-dimethyl phosphorothioate.

21. A compound according to claim 1 which is S-[(1-methyl-2,4-dioxo-6-methyl hexahydropyrimidinyl-3) methyl] O,O-dimethyl phosphorothioate.

22. A compound according to claim 1 which is S-[(1-methyl-2,4-dioxo hexahydropyrimidinyl-3) methyl] O,O-dimethyl phosphorodithioate.

23. A compound according to claim 1 which is S-[(1-methyl-2,4-dioxo hexahydropyrimidinyl-3) methyl] O,O-diethyl phosphorodithioate.

24. A compound according to claim 2 which is S-[(1-methyl-2,4-dioxo tetrahydropyrimidinyl-3) methyl] O,O-diethyl phosphorothioate.

References Cited
UNITED STATES PATENTS
3,270,019  8/1966  Friedlander et al. ____ 260—260

ALEX MAZEL, Primary Examiner
A. M. T. TIGHE, Assistant Examiner

U.S. Cl. X.R.
260—247.1, 256.4 E, 256.5 R, 465.5 R, 465.4; 424—251